United States Patent [19]

Sugita et al.

[11] Patent Number: 5,537,637
[45] Date of Patent: Jul. 16, 1996

[54] MEDIUM-FREQUENCY RADIO BROADCASTING RETRANSMISSION SYSTEM FOR CONFINED AND ELECTROMAGNETICALLY SHIELDED AREAS

[75] Inventors: Tadao Sugita; Tatehiko Toyosawa; Kazumi Shoji; Shinichi Watanabe, all of Tokyo; Atsumi Fujiwara; Masaaki Kitanda, both of Hiroshima City, all of Japan

[73] Assignees: NHK Integrated Technology, Inc.; Nippon Hoso Kyokai, both of Tokyo, Japan

[21] Appl. No.: 207,209

[22] Filed: Mar. 8, 1994

[30] Foreign Application Priority Data

Sep. 21, 1993 [JP] Japan ................................. 5-234892
Dec. 6, 1993 [JP] Japan ................................. 5-305537

[51] Int. Cl.$^6$ ................................................. H04B 7/14
[52] U.S. Cl. .............................. 455/14; 455/55.1; 455/66
[58] Field of Search ........................ 455/66, 55.1, 53.1, 455/108, 14, 280

[56] References Cited

U.S. PATENT DOCUMENTS

| 4,457,019 | 6/1984 | Szabo, Jr. et al. ................ 455/50.1 |
|---|---|---|
| 4,476,574 | 10/1984 | Struven ............................ 455/55.1 |
| 4,777,652 | 10/1988 | Stolarczyk ........................ 455/55.1 |
| 4,868,887 | 9/1989 | Bertrand ............................... 455/66 |
| 4,879,755 | 11/1989 | Stalarczyk et al. ................ 455/55.1 |

FOREIGN PATENT DOCUMENTS

| 153239 | 8/1985 | European Pat. Off. . |
|---|---|---|
| 225607 | 6/1987 | European Pat. Off. . |
| 3036358 | 4/1981 | Germany . |
| 612552 | 7/1979 | Switzerland . |
| 1389554 | 4/1975 | United Kingdom . |
| 9013950 | 11/1990 | WIPO ................................... 455/66 |

Primary Examiner—Edward F. Urban
Attorney, Agent, or Firm—Oliff & Berridge

[57] ABSTRACT

A medium-frequency radio transmission system is formed by installing a receiving antenna for receiving an amplitude-modulated medium-frequency radio wave at the rooftop of an existing building, receiving the medium-frequency radio wave, coupling the received medium-frequency radio wave to an existing distributing cable or distributing conductive piping with or without a coupler for the radio wave, and transmitting the radio wave to a predetermined floor. At the predetermined floor the basement or tunnel of an existing building such as underground shopping mall, underground parking lot, underground railway, road tunnel or deep space of massive building is provided with a coupling such as an existing loop-like or linear wiring or piping line with or without a coupler.

3 Claims, 4 Drawing Sheets

MEDIUM-FREQUENCY RADIO BROADCASTING RETRANSMISSION SYSTEM FOR CONFINED AND ELECTROMAGNETICALLY SHIELDED AREAS

BACKGROUND OF THE INVENTION

1. Field of the Invention

The present invention relates to a medium-frequency radio Transmission system for enabling listening to an AM medium-frequency radio within broadcast wave closed areas such as underground shopping malls, underground parking lots, underground connection passages, underground railways, automobile road tunnels or deep spaces of massive buildings (hereinafter referred to as "tunnel" or "basement" for the sake of explanation).

2. Description of the Related Art

In case of receiving an AM radio wave at the rooftop of an existing high-storied building and transmitting the received radio wave to a basement, prior art has newly built a coaxial cable for transmitting medium-frequency radio waves from the rooftop to the basement within the existing building.

Moreover, in order to reradiate a wave, there was required construction work such as a new inductive line stretched on the wall surface.

In the prior art, since the required construction had to be executed within the existing building, difficult work was generally necessary, and a large amount of expense was required.

SUMMARY OF THE INVENTION

An object of the present invention, therefore, is to provide a medium-frequency radio transmission system, especially a medium-frequency radio transmission system into a tunnel, which can couple, via couplers, a medium-frequency radio to existing distributing cables (i.e., electric lines, telephone lines, MATV (Master-Antenna TV) coaxial cables and the like), or to distributing conductive pipings. The system transmits the wave so that it is picked up by the couplers at the basement or tunnel so as to exclude the above-described problems.

In order to attain this object, a first system for transmitting medium-frequency radio waves according to the present invention is formed by installing a receiving antenna for receiving an amplitude-modulated medium-frequency radio wave at the rooftop of an existing building, receiving the medium-frequency radio wave, coupling the received medium-frequency radio wave to an existing distributing cable or distributing conductive piping by a coupler for the radio wave, and transmitting the radio wave to a predetermined floor.

A preferred embodiment of the present invention is characterized by coupling the medium-frequency radio wave transmitted to the predetermined floor to an existing or new loop-like line via a pair of radio wave couplers and reradiating the medium-frequency radio wave from its loop-like line for enabling listening to the amplitude-modulated medium-frequency radio wave at the predetermined floor.

A second system for transmitting medium-frequency radio waves according to the present invention includes receiving a medium-frequency radio wave by installing a receiver antenna for receiving an amplitude-modulated medium-frequency radio wave at the top of an existing building or at the upper portion of ground facilities. The received medium-frequency radio wave is then coupled to existing wiring or piping by a coupler for the medium-frequency radio wave. Subsequently the wave is transmitted to a predetermined underground basement or tunnel, fed to existing linear wiring or piping within an underground basement or a tunnel, and reradiated from the radio wave current-fed linear wiring or piping.

A third system for transmitting medium-frequency radio wave, especially into a tunnel, according to the present invention includes receiving a medium-frequency radio wave by installing a receiver antenna for receiving an amplitude-modulated medium-frequency radio wave at the upper portion of ground facilities and feeding the received medium-frequency radio wave to existing wiring or piping within a tunnel via a booster. The booster includes at least one phase-shift device for an amplitude-modulated radio wave. Subsequently, the medium-frequency radio wave is reradiated from the radio wave current-fed wiring or piping.

The present system has such advantages that engineering work becomes simple and expenditure can be curtailed drastically with the aid of existing distributing cables or distributing conductive pipings of an existing building for transmitting radio waves. For example, the process is simplified with the aid of loop-like lines or linear wiring by utilizing the existing distributing cables and distributing conductive pipings according to circumstances with respect to reradiation at the underground basement or tunnel, because there is no need to construct any new coaxial cable or to newly stretch any inductive line on the wall surface.

BRIEF DESCRIPTION OF THE DRAWING(S)

Figure 1:
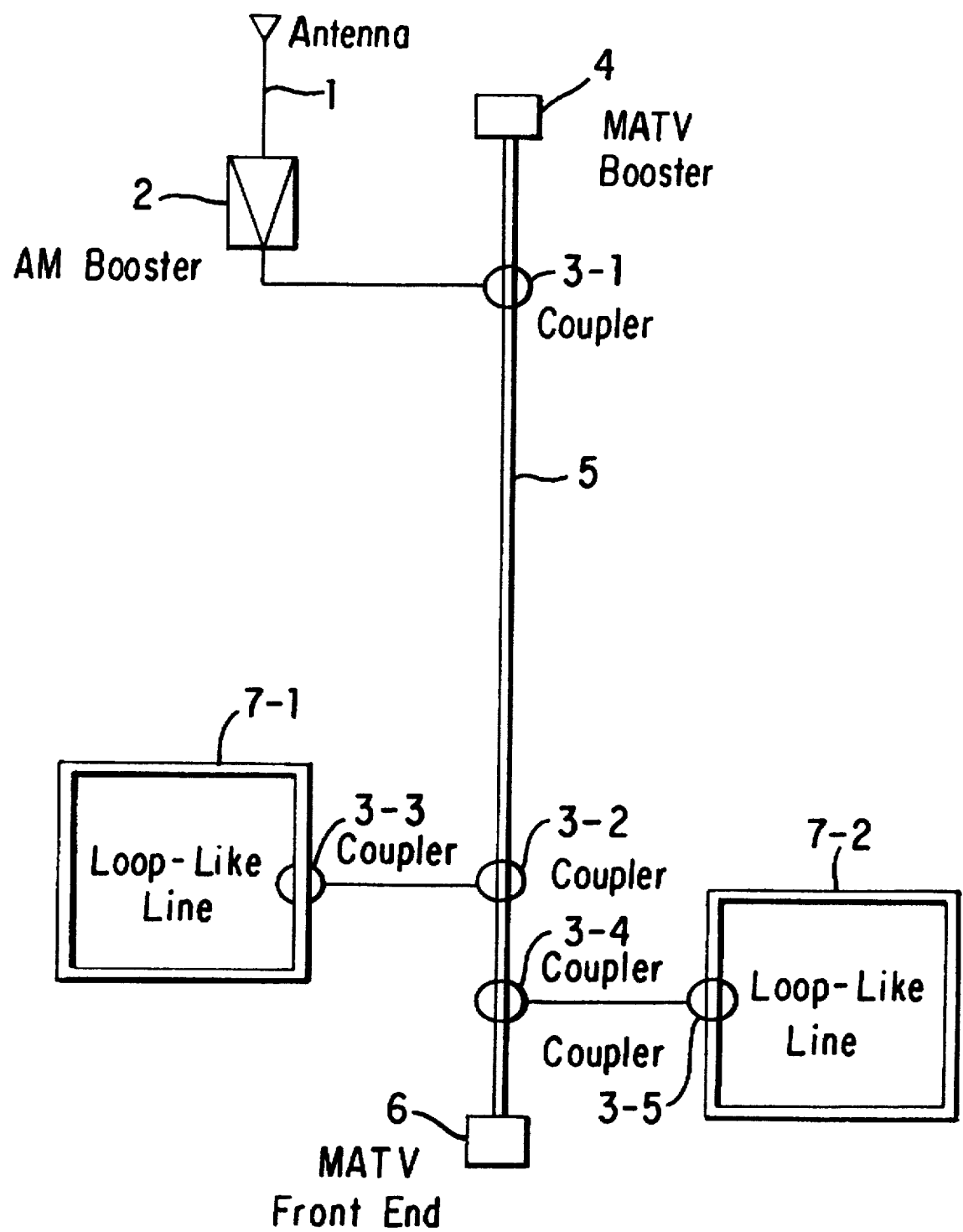
FIG. 1 shows a schematic diagram of a first embodiment relating to the transmission system of the present invention.

In the Figures the reference numerals represent the following features: 1 is a radio receiving antenna, 2 is an AM booster, 3-1, 3-2 are couplers, 4 is an MATV (Master-Antenna TV) booster, 5 is an existing coaxial cable, 6 is an MATV front end, 7-1, 7-2 are loop-like lines, 8 is a primary line, 9 is a secondary line, 10-1, 10-2 are ferrite cores, 21 is a medium-frequency radio receiving antenna, 22 is a booster, 23-1, 23-2 are couplers, 24 is an existing coaxial cable, 25 is an MATV booster, 26 is an MATV front end, 27 is a commercial electrical source, 28 is a high-tension transformer, 29 is an earth, 30 is a switchboard, 31 is a condenser, 32 is a contact, 33 is a tunnel, 34 is a lighting lamp wiring, 35 is a lighting lamp, 51 is a medium-frequency radio receiving antenna, 52 is a feeder, 53 is a booster, 54 is a tunnel, 55 is a lighting lamp, 56 is a phase shifter, 57 is a level regulator and 58 is an impedance matching device.

DESCRIPTION OF THE PREFERRED EMBODIMENT

The present invention will be explained with an embodiment by referring to the accompanying drawings.

FIG. 1 shows a schematic diagram of an embodiment relating to the transmitting system of the present invention.

In FIG. 1, an antenna 1 is for receiving an amplitude-modulated medium-frequency radio, and in the system of the present invention, the antenna 1 is newly provided at the rooftop of a predetermined existing building. A wave received by this antenna 1 is amplified to a sufficiently high level by a booster 2. In this embodiment, the amplified wave is coupled to an outer conductor of an existing MATV coaxial cable (5 C-2 V 150 m) 5 via a coupler 3-1 which will be explained later on. In this case, the cable 5 shown herein is not limited but may preferably be any electric lines such as lamp lines, telephone lines and the like, and may be a conductive distributing piping, if circumstances require.

This wiring or piping becomes a secondary line of a coupler 3-1, so that it is necessary to form a loop-like circuit including ground lead wirings and floating capacitance with the ground, for a medium-frequency radio wave of frequency aimed at. When the cable 5 is an MATV coaxial cable as in this embodiment, its outer conductor is commonly earthed at an MATV booster 4 at the rooftop and a front end 6 at the basement, respectively, so that the secondary line of a coupler advantageously becomes loop-like circuit by the outer conductor of the cable and ground.

In this embodiment, a loop 7-1 is a loop-like line constructed by utilizing an existing exhaust duct at the ceiling of an underground parking lot. The medium-frequency radio wave is transmitted by coupling the medium-frequency radio wave taken out of a coaxial line by a coupler 3-2 to the loop-like line 7-1 again by a coupler 3-3. Thereby a good medium-frequency radio can be audible even in the underground parking lot of the existing building.

According to the present system the medium-frequency radio wave can flow through the loop-like line 7 to not only one loop like line 7-1 but also to a plurality of loops such as a loop 7-2. It was confirmed as a result of the experiment that a wave can smoothly be transmitted up to about 10 km total length of the loop line.

Figure 2:
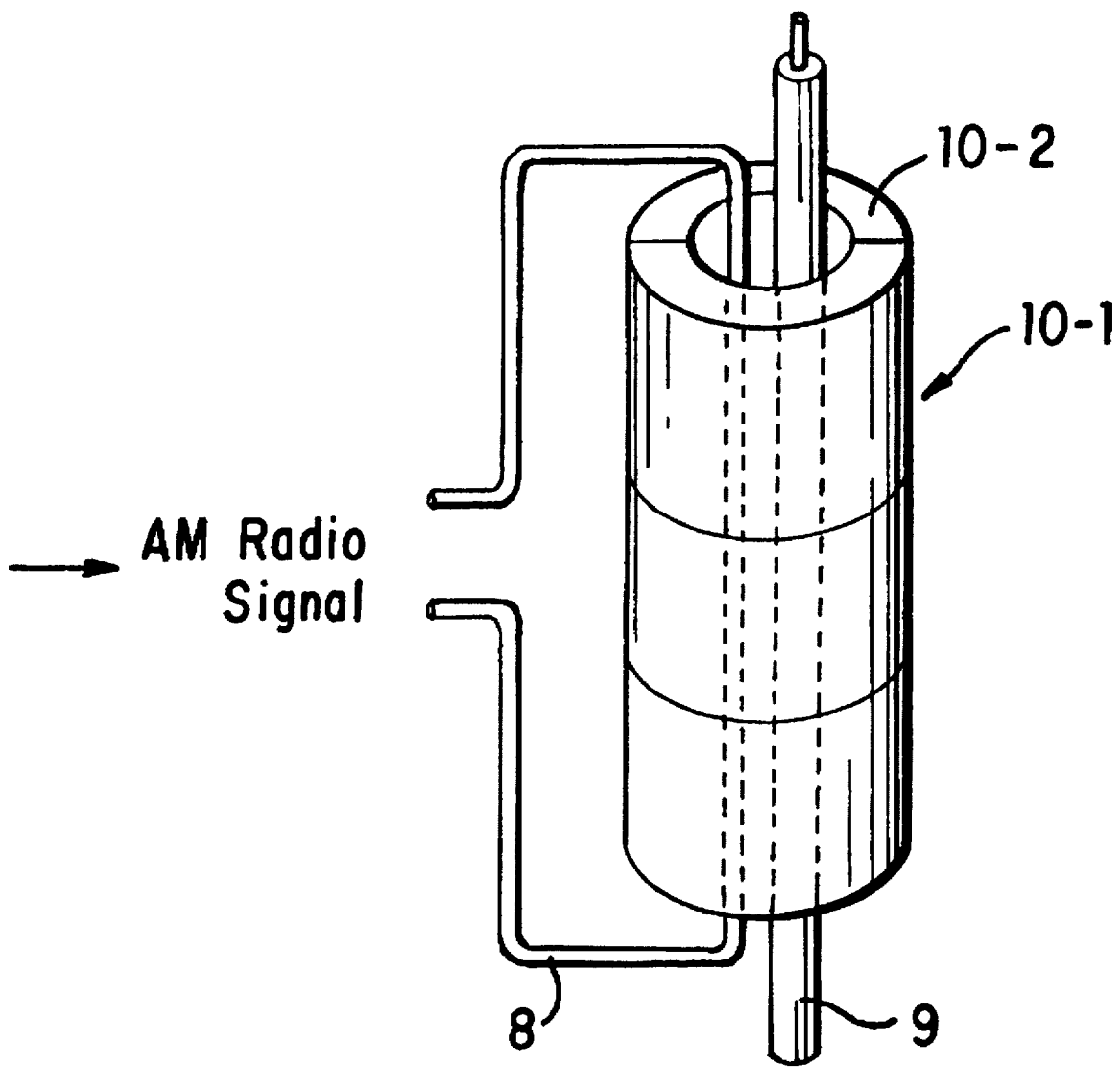
FIG. 2 shows a construction of a coupler relating to the transmission system of the present invention.

FIG. 2 shows one embodiment of a coupler construction, in which two U-shaped ferrite cores 10-1 and 10-2 sandwich a primary line 8 and a secondary line 9 such as an existing coaxial cable and the like so as to couple a medium-frequency radio wave to the primary and secondary lines. In the experiment, the ferrite core is 13 mm$\phi$ in inner diameter, 26 mm$\phi$ in outer diameter and 28 mm in longitudinal length, 6–10 of which are used.

An embodiment of the present system was explained by referring to FIGS. 1 and 2, but the present invention is not limited thereto, and can be modified and changed within the scope of the invention specified in claims. For example, a floor of the building which the present invention is applied to is not limited to the basement, but can be applied to the deep space of a massive building, that is, any floor above the ground. The coaxial cable 5 for transmitting a received wave from the rooftop to a predetermined floor of an existing building is not limited to an MATV cable shown in FIG. 1, but may be any cable such as lamp line, telephone line and the like, and may preferably be a conductive distributing piping, if circumstances require. Moreover, the loop-like line 7 is not limited to the existing distributing cable and distributing conductive piping, but can utilize conductive structure and equipments.

In addition, a medium-frequency wave frequency of the present system is from about 100 kHz to 5 MHz.

Figure 3:
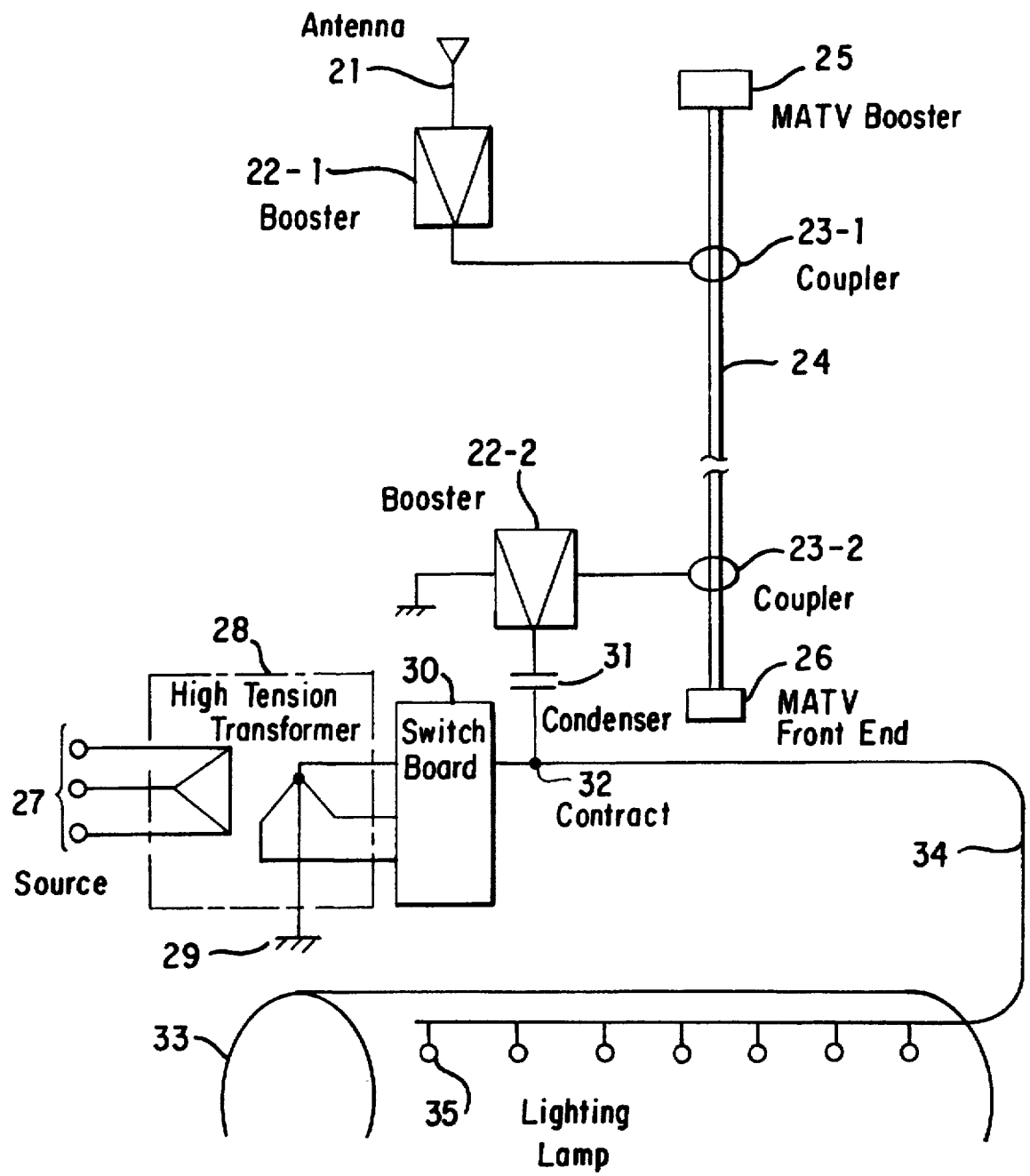
FIG. 3 shows a schematic diagram explaining a second embodiment of the present invention.

FIG. 3 shows a second embodiment relating to the system according to the present invention, that is, a schematic diagram when radiation of a radio wave at the underground utilizes a conductive lamp wire already substantially linearly arranged within a tunnel.

A tunnel 33 shown here can concretely be imagined as the inside of a tunnel within an underground railway or the inside of an automobile road tunnel or the substantially linear passageway or pedestrian underground passageway of an underground shopping mall. The place for laying a receiver antenna 21 to be utilized in this case can be imagined as a station building along an underground railway, an automobile road tunnel or any building in the vicinity of an entrance and exit of a pedestrian underground passage.

In FIG. 3, the antenna 21 is an antenna for receiving amplitude-modulated medium-frequency radio, and this antenna 21 is newly provided on the rooftop of a predetermined existing building in the present invention. A radio wave received by this antenna 21 is then amplified to a sufficiently high level by a booster 22-1. The thus amplified radio wave is coupled to outer conductor of an existing MATV coaxial cable (5 C-2 V) 24 in this embodiment by a coupler 23-1. In this case, the cable 24 shown here is not limited, but may preferably be any cable such as lamp line, telephone line and the like connected into the above-described tunnel, and conductive piping according to circumstances.

This wiring or piping becomes a secondary line of a coupler 23-1, so that it is necessary to form a loop-like circuit including ground lead wirings and floating capacitance with the ground, for a medium-frequency radio wave of frequency aimed at. When the cable 24 is an MATV coaxial cable as in the embodiment illustrated in FIG. 3, its outer conductors are earthed at an MATV booster 25 at the rooftop and a front end 26 at the underground, respectively, so that the secondary line of a coupler advantageously becomes a loop-like circuit through the outer conductor of the cable and ground.

The medium-frequency radio wave introduced into a predetermined ground from the rooftop is radiated within a tunnel via a linear lighting lamp wiring already laid within the tunnel. Than is, the radio wave derived from the vicinity of the underground end portion of the cable 24, illustrated in FIG. 3 by another coupler 23-2 is again amplified by another booster 22-2, and fed to a wiring 34 for a tunnel lighting lamp 35. The lamp communicates with a commercial electrical source 27 (such as 6600 V, 3 phase), a high-tension transformer 28 (dropping to 200 V, 3 phase) and a switchboard 30, at a contact point 32 of the wiring via a condenser 31. The radiation condition of the radio wave from the lighting lamp wiring 34 merits further description. Generally, in transmission of a medium-frequency radio wave, a linear vertical antenna is used and a good radio wave is radiated. Even if the vertical antenna is laid horizontally and provided within a tunnel, the radio wave is deteriorated to some extent as compared with the radio wave from a vertical antenna. Nevertheless, the wave can be radiated. Therefore, electromagnetic field intensity sufficient to facilitate listening to a medium-frequency radio wave within a tunnel can be obtained.

Thus, the medium-frequency radio wave within a tunnel becomes audible due to a radio wave radiated by the lighting lamp wiring 34. As a result of the experiment, it was confirmed that the above wiring 34 can well transmit a radio wave to about 1 km.

In case of utilizing a lighting lamp wiring 34 via a switchboard 30 for radiation as illustrated in FIG. 3 of the present invention, there is no problem when an electric current is applied via the switchboard (because of an earth on the primary side). However when a switch of the switchboard 30 is cut off to become nonconductive, only the following wiring 34 after that cannot constitute a loop-like line. Therefore, the coupling system corresponding to the coupler 3-3 illustrated in FIG. 1 cannot be used. The present inventors have assumed such a case and proposed to feed a radio wave to a radiation line via a condenser 31 as in the present invention.

In case of utilizing a ladder for loading lines already substantially linearly arranged within a tunnel, the radiation of a radio wave under the ground becomes simplified. A schematic diagram of this case is not illustrated, but its explanation is simple, and the ladder itself is not active, so that it is possible to feed the radio wave current by directly connecting an output line of the booster 22-2 illustrated in FIG. 3 to one end of the ladder without passing through a condenser 31.

Moreover, when the place for setting the antenna 21 and the booster 22-1 is close to a feeder point within the tunnel, it is possible to further omit a transmission line 24 and to directly feed the radio wave current from the output of the booster 22-1 to a radiation conductor within the tunnel.

Figure 4:
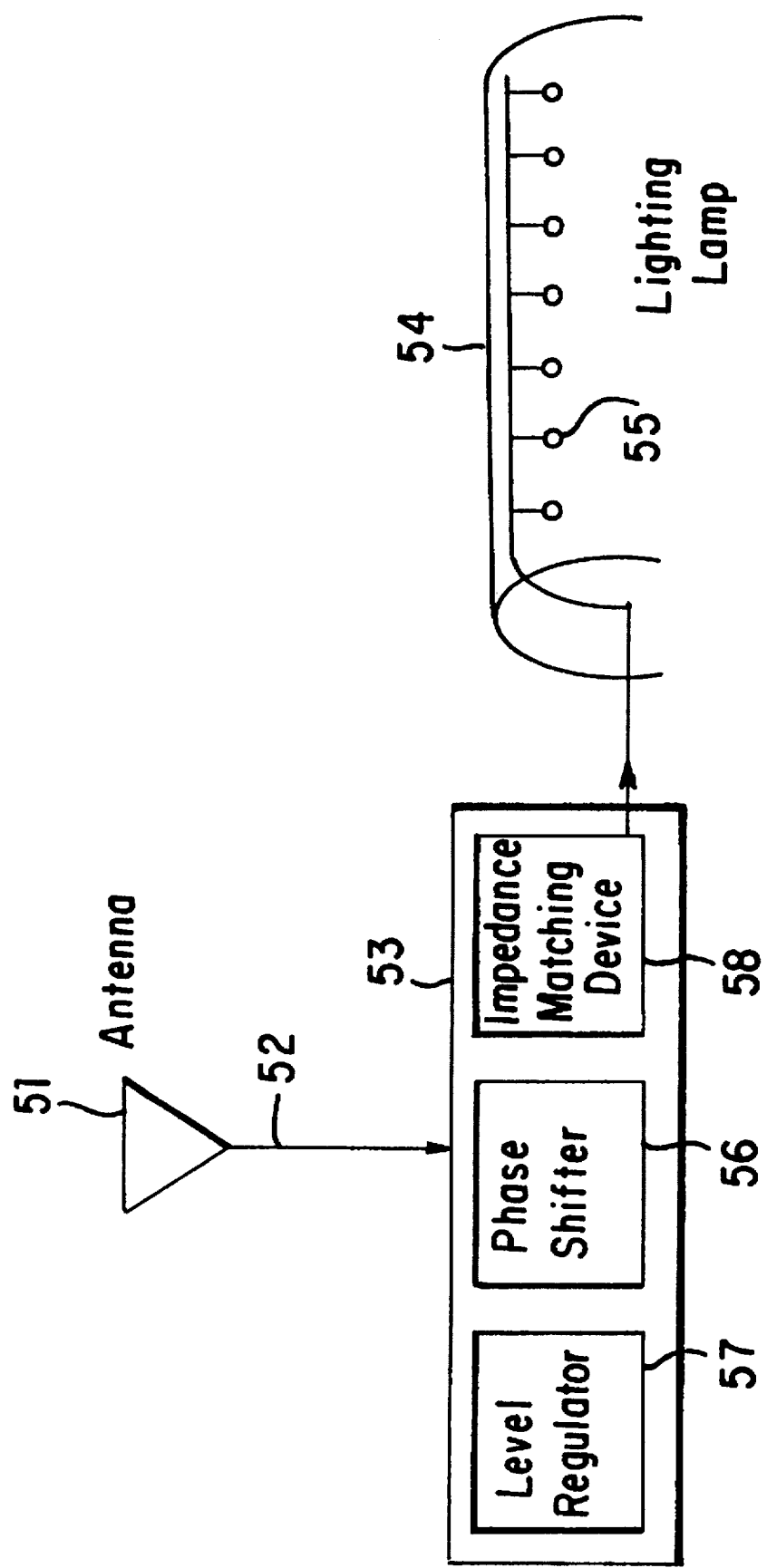
FIG. 4 is a schematic diagram explaining a third embodiment of the present invention.

A third embodiment of the present invention is a case of reradiating a medium-frequency radio wave within a tunnel such as a tunnel for a highway road as shown in FIG. 4. A receiver antenna 51 is placed on the ground above the tunnel or the rooftop of a near building. An output of the antenna 51 is connected to a reradiation booster 53 via a feeder 52, an output of the booster 53 is coupled to an existing lighting cable 55 such as fire-extinguishing piping or conduit piping and the like within a tunnel 54, and a radio wave within the tunnel 54 is reradiated. In the booster 53 is provided at least one phase shifter or delay line 56 for an amplitude-modulated radio wave, and preferably a phase shifter 56, a level regulator 57 and an impedance matching device 58 by every channel of radio waves. As the phase shifter or delay line, use is made of lumped-constant network such as L, C and the like. Any known method can be carried out, and delay elements such as SAW, CCD and the like can be used.

Setting a receiver antenna 51 in some positions will cause it to receive a reradiation wave and cause oscillation. Admixing of a direct wave and a reradiation wave may occur within a tunnel. Giving the optimum phase shift to the reradiation wave, the oscillation is prevented and radio wave field distribution within the tunnel is optimized. It is preferable to carry out at every channel, and level regulation 57 is further carried out, and an output of the booster 53 is coupled by impedance matching 58 to the existing cable under the optimum impedance matching condition. Thereby, good medium-frequency reception within the tunnel becomes possible. As a result of the experiment, it was confirmed that when the output of the booster 53 is 0.2 watt, medium-frequency radio is excellently received over the whole tunnel of 750 m in length.

Some embodiments of the present invention were explained by referring to FIGS. 3 and 4, but the present invention is not limited to these embodiments, but can be modified and changed within the scope of the invention specified in the claims. For example, when a wave energy in large at the point of the coupler 23-2 illustrated in FIG. 3, the booster 22-2 can be omitted.

As explained above, the prior art required new construction of a coaxial cable and the like for transmitting a medium-frequency radio within a wave closed area such as an underground shopping mall, and further required difficult work and a large amount of expense. In the system according to the present invention, the existing distributing cables and distributing conductive piping for transmission are used, and no construction of coaxial cables and the like is required. The system that has a great deal of economic effect.

Moreover, the medium-frequency wave coupler shown herein employs a method of sandwiching distributing cables with U-shaped ferrite cores, so that work can be simplified as the existing distributing cables are active. Thus an economic effect is high from this point of view.

In order to newly lay an inductive line for reradiating a medium-frequency radio wave within the already existing underground railway or automobile road tunnel, the prior art disadvantageously requires complicated and difficult work and a great amount of expense. Particularly, work at the high place within a tunnel at mid-night or during traffic control requires a number of maintenance personnel whose expenses boomerang on every cost. Contrary to the above, the present invention utilizes existing lines, piping and the like, so that a tremendous economical effect can be expected.

Furthermore, according to the system of the present invention, it becomes possible to easily listen to a medium-frequency radio broadcast within broadcast wave closed areas such as underground shopping malls, underground parking lots, underground connection passages, underground railways, tunnels or deep spaces of massive buildings, and social public convenience can greatly be facilitated for not only daily broadcast service but also emergency.

We claim:

1. A system for transmitting a medium-frequency radio wave into a tunnel comprising:

a receiving antenna for receiving an amplitude-modulated medium-frequency radio wave at an upper portion of ground facilities;

a first booster connected to said antenna and comprising a phase shifter, a level regulator, and an impedance matching device for preventing oscillation;

a coupler connected to said booster and coupled with existing wiring or piping for coupling the received medium-frequency radio wave to existing wiring or piping, said existing wiring or piping transmitting the wave to a tunnel or a predetermined underground;

a second booster connected to said existing wiring or piping with an another coupler and comprising a phase-shifter, a level-regulator, and an impedance matching device for preventing oscillation; and existing linear wiring or piping prepared within a tunnel of the predetermined underground for receiving the transmitted medium-frequency radio wave via said second booster, the second booster feeding the transmitted medium-frequency radio wave to a condenser, and said condenser feeding radio wave current to said existing linear wiring or piping wherein said existing linear wiring or piping is conductive, and the medium-frequency radio wave is reradiated from said existing linear wiring or piping.

2. A system for transmitting a medium-frequency radio wave into a tunnel as defined in claim 1, wherein said existing linear wiring or piping is not active, and the radio wave current is directly fed thereto without a condenser.

3. A system for transmitting a medium-frequency radio wave into a tunnel as defined in claim 1, wherein said coupler is a ferrite core surrounding a primary line and a secondary line.

* * * * *